US010439696B1

(12) United States Patent
Baek et al.

(10) Patent No.: US 10,439,696 B1
(45) Date of Patent: Oct. 8, 2019

(54) COVARIANCE MATRIX FOR ADAPTIVE BEAMFORMING

(71) Applicant: Northrop Grumman Systems Corporation, Falls Church, VA (US)

(72) Inventors: Andrew S. Baek, Irvine, CA (US); Thompson Truong, Fullerton, CA (US); Othon Equihua, Downey, CA (US); Kevin Kanemori, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/127,597

(22) Filed: Sep. 11, 2018

(51) Int. Cl.
  *H04L 27/00* (2006.01)
  *H04B 7/06* (2006.01)
(52) U.S. Cl.
  CPC .................................. *H04B 7/0617* (2013.01)
(58) Field of Classification Search
  CPC .................................................... H04B 7/0617

USPC ......................................................... 375/299
See application file for complete search history.

(56) References Cited

U.S. PATENT DOCUMENTS

| | | | | |
|---|---|---|---|---|
| 6,064,338 | A * | 5/2000 | Kobayakawa | ............ G01S 3/14 |
| | | | | 342/378 |
| 6,952,460 | B1 * | 10/2005 | Van Wechel | ............ G01S 1/024 |
| | | | | 342/357.59 |
| 2014/0064403 | A1 * | 3/2014 | Woodsum | ........... H04L 27/2601 |
| | | | | 375/295 |

* cited by examiner

*Primary Examiner* — Don N Vo
(74) *Attorney, Agent, or Firm* — McCracken & Gillen LLC

(57) ABSTRACT

A method and apparatus for generating a covariance matrix during adaptive beamforming of a multi-beam antenna. The method uses an upper right triangle of the covariance and time sharing of complex conjugate multipliers to efficiently compute the covariance matrix. In addition, a variable number of beams may be selected in the covariance matrix according to an operating environment of the multi-beam antenna.

15 Claims, 7 Drawing Sheets

Fig. 8

Table 3

| Address In | row | col | Address out | Address In | row | col | Address Out |
|---|---|---|---|---|---|---|---|
| 0 | 000 | 000 | 0 | 32 | 100 | 000 | 36 |
| 1 | 000 | 001 | 1 | 33 | 100 | 001 | 42 |
| 2 | 000 | 010 | 2 | 34 | 100 | 010 | 47 |
| 3 | 000 | 011 | 3 | 35 | 100 | 011 | 51 |
| 4 | 000 | 100 | 4 | 36 | 100 | 100 | 22 |
| 5 | 000 | 101 | 5 | 37 | 100 | 101 | 23 |
| 6 | 000 | 110 | 6 | 38 | 100 | 110 | 24 |
| 8 | 001 | 000 | 33 | 40 | 101 | 000 | 37 |
| 9 | 001 | 001 | 7 | 41 | 101 | 001 | 43 |
| 10 | 001 | 010 | 8 | 42 | 101 | 010 | 48 |
| 11 | 001 | 011 | 9 | 43 | 101 | 011 | 52 |
| 12 | 001 | 100 | 10 | 44 | 101 | 100 | 55 |
| 13 | 001 | 101 | 11 | 45 | 101 | 101 | 25 |
| 14 | 001 | 110 | 12 | 46 | 101 | 110 | 26 |
| 16 | 010 | 000 | 34 | 48 | 110 | 000 | 38 |
| 17 | 010 | 001 | 40 | 49 | 110 | 001 | 44 |
| 18 | 010 | 010 | 13 | 50 | 110 | 010 | 49 |
| 19 | 010 | 011 | 14 | 51 | 110 | 011 | 53 |
| 20 | 010 | 100 | 15 | 52 | 110 | 100 | 56 |
| 21 | 010 | 101 | 16 | 53 | 110 | 101 | 58 |
| 22 | 010 | 110 | 17 | 54 | 110 | 110 | 27 |
| 24 | 011 | 000 | 35 | | | | |
| 25 | 011 | 001 | 41 | | | | |
| 26 | 011 | 010 | 46 | | | | |
| 27 | 011 | 011 | 18 | | | | |
| 28 | 011 | 100 | 19 | | | | |
| 29 | 011 | 101 | 20 | | | | |
| 30 | 011 | 110 | 21 | | | | |

Table 4

|  | Row/col | 000<br>0 | 001<br>1 | 010<br>2 | 011<br>3 | 100<br>4 | 101<br>5 | 110<br>6 |
|---|---|---|---|---|---|---|---|---|
| 000 | 0 | 0 | 1 | 2 | 3 | 4 | 5 | 6 |
| 001 | 1 | 33 | 7 | 8 | 9 | 10 | 11 | 12 |
|  |  |  |  |  |  |  |  |  |
| 010 | 2 | 34 | 40 | 13 | 14 | 15 | 16 | 17 |
| 011 | 3 | 35 | 41 | 46 | 18 | 19 | 20 | 21 |
| 100 | 4 | 36 | 42 | 47 | 51 | 22 | 23 | 24 |
| 101 | 5 | 37 | 43 | 48 | 52 | 55 | 25 | 26 |
| 110 | 6 | 38 | 44 | 49 | 53 | 56 | 58 | 27 |

COVARIANCE MATRIX FOR ADAPTIVE BEAMFORMING

GOVERNMENT CONTRACT

The United States Air Force has rights in this invention pursuant to Government Contract No. F04701-02-C-0002.

TECHNICAL FIELD

Various example embodiments relate generally to adaptive beam-forming and more particularly to obtaining optimal combining weights using a covariance matrix.

BACKGROUND

Adaptive beamforming is a technique of using spatial signal processing to combine signals from an array of antennas to increase signal strength to or from a preferred location. It is used in both transmitting and receiving signals. Spatial signal processing involves determining optimal weights for each signal, or beam, before they are combined and thus maximizing the signal-to-noise ratio (SNR) of the signal sent to or received from a particular direction.

Spatial signal processing may include the use of a covariance matrix, which stores correlation statistics of the variation between signals. Calculating a covariance matrix is very resource intensive for a processing system. For example, for a 4×4 array of 16 elements, 136 correlations must be calculated. This may require significant hardware capability, in other words, multipliers and/or memory. It may also require a powerful common processor or a complicated multiplexing scheme.

Thus, a need exists for simplifying the hardware for calculation of a covariance matrix during adaptive beamforming.

SUMMARY

A method and apparatus for generating a covariance matrix during adaptive beamforming of a multi-beam antenna is disclosed. The method uses an upper right triangle of the covariance and time sharing of complex conjugate multipliers to efficiently compute the covariance matrix. In addition, a variable number of beams may be selected in the covariance matrix according to an operating environment of the multi-beam antenna.

The invention in one implementation encompasses a method of generating a covariance matrix for digital beamforming in a computer processor on input signals from antenna beams stored in a buffer. The method includes steps of receiving a set of $N_B$ input signals from the buffer where $N_B$=the number of antenna beams; generating a temporary $N_B \times N_B$ covariance matrix; dividing the $N_B$ input signals into Set A and Set B; performing a complex-conjugate multiplication operation on Set A, adding the result to previous Set A accumulator results and storing in Set A accumulators; performing a complex-conjugate multiplication operation on Set B, adding the result to previous Set B accumulator results and storing in Set B accumulators; and combining the Set A and Set B results to form an $N_B \times N_B$ covariance matrix.

In a further embodiment, each input signal further includes a plurality of data symbols and the method is repeated for each of the plurality of symbols.

In another embodiment, the Set A and Set B accumulators are cleared after the covariance matrix is generated.

In several embodiments, the number of data symbols may be, for example, 42, 84 or 168.

In any of the above embodiments, the number of antenna beams may be 7.

In a further embodiment, the method includes the steps of determining a set of $N_B$ diagonal elements of the $N_B \times N_B$ covariance matrix; for each element in the set of diagonal elements: scaling the element with a constant; comparing the scaled result with a maximum element of the set of diagonal elements; and marking a corresponding element in masking index as true or false; and using the masking index to select elements in the $N_B \times N_B$ covariance matrix.

In another embodiment, the masking index may be used on both rows and columns of the $N_B \times N_B$ covariance matrix.

In a further embodiment, the constant may be a variable beam threshold based on an operating environment of the antenna.

In another embodiment, the invention encompasses a computer processor apparatus configured to perform a method of generating a covariance matrix for digital beamforming the input signals from one or more elements of multi-beam antenna. The computer processor apparatus includes a buffer for storing $N_B$ input signals where $N_B$=the number of antenna beams; a logic element for generating a temporary $N_B \times N_B$ covariance matrix from the $N_B$ input signals; a set of $N_B (N_B+1)/4$ complex conjugate multipliers; a first multiplexer for receiving $N_B (N_B+1)/2$ elements of the temporary covariance matrix further comprising an upper right triangle of the temporary covariance matrix and alternately coupling half of the $N_B (N_B+1)/2$ elements to the set of complex conjugate multipliers; a set of $N_B (N_B+1)/2$ accumulators divided into first and second sets of $N_B (N_B+1)/4$ accumulators which alternately receive outputs from the set of complex conjugate multipliers; and a second multiplexer alternately coupling the output of the first and second sets of $N_B (N_B+1)/4$ accumulators to an input of the set of $N_B (N_B+1)/4$ complex conjugate multipliers.

In a further embodiment, $N_B$ may be 7.

In another embodiment, the apparatus also includes an $N_B$ buffer for storing a set of diagonal elements of the covariance matrix; a scaling logic element for scaling each element in the set of diagonal elements by a constant value; a comparator for comparing each scaled element with a maximum element of the set of diagonal elements and generating a true or false output corresponding to the result of the comparison; and an $N_B$ mask buffer for storing the output of the comparator for each element in the set of diagonal elements.

In yet another embodiment, the apparatus includes a selection device for using the $N_B$ mask buffer to select elements of the covariance matrix.

In another embodiment, the constant value may be a variable beam threshold based on an operating environment of the multi-beam antenna.

DESCRIPTION OF THE DRAWINGS

Features of example implementations of the invention will become apparent from the description, the claims, and the accompanying drawings in which:

FIG. 8 is table used for QR decomposition processing; and

FIG. 9 is another table used for QR decomposition processing.

DETAILED DESCRIPTION

Figure 1:
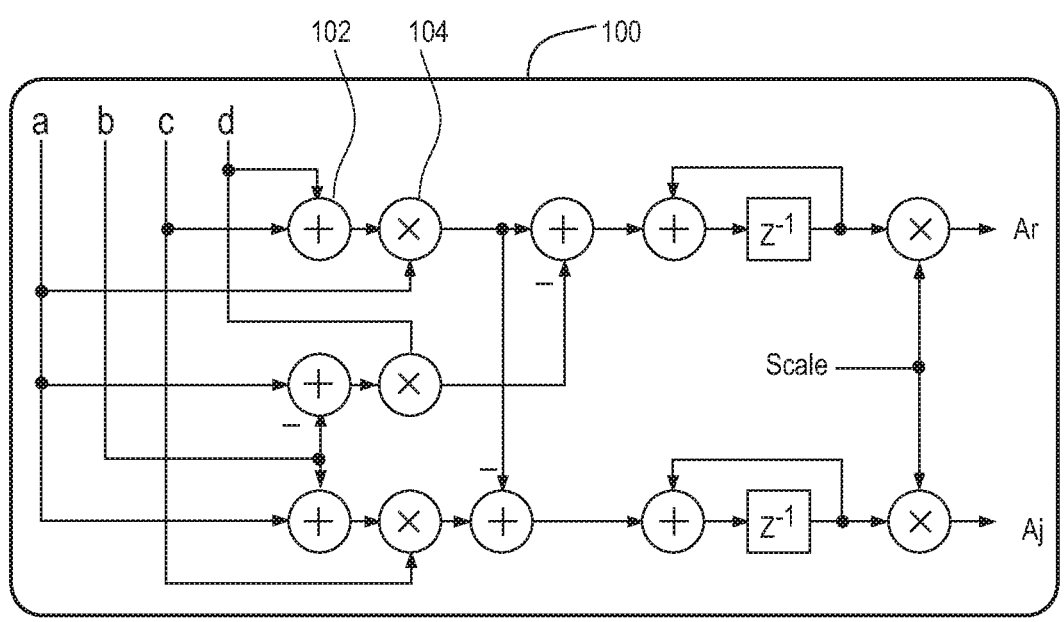
FIG. 1 depicts an accumulator for calculating a covariance matrix.

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

In general, beamforming combines signals from an array of antennas to transmit and receive directional signals using the principles of constructive and destructive interference. Signals detected by each antenna in the array are phased, or weighted, by varying amounts so as to transmit or receive a desired signal from a terminal. In an embodiment, this may be accomplished with an algorithm that uses a frequency hopped system as the target environment. A frequency-hopped system transmits signals by rapidly switching between different frequency channels. This approach is capable of operating in scenarios including both an AWGN (Additive White Gaussian Noise) and an AWGN with jamming environment. Additionally, this approach can also be used in the presence of non-hostile interference such as that which often occurs in a crowded telecommunications environment. A beamforming algorithm and apparatus may include, for example, a maximum likelihood alpha estimator, a symbol quality estimator and an optimal combining algorithm with dynamic noise loading. QR decomposition as well as a covariance matrix and an alpha estimate generated from beam antenna input signals are some of the intermediate steps used to generate combining weights for beamforming.

In an embodiment, a multi-beam antenna includes seven antennas, although any number of antennas may be used. For the following discussion, reference will be made to a seven beam antenna solely for purposes of illustration. Beamforming is performed on an input signal X where X is a matrix of $N_B \times N_{sym}$, $N_B$=# antenna beams and $N_{sym}$=# of symbols from each beam. In an embodiment of 7 beams, for example, matrix X may be defined as having dimensions of 7×42 although other values for $N_{sym}$ may be used, for example, 84 or 168. The input signal is given by:

$$X = \begin{bmatrix} x_{1,N_{sym}} & \cdots & x_{1,1} \\ \vdots & \ddots & \vdots \\ x_{7,N_{sym}} & \cdots & x_{7,1} \end{bmatrix} \quad (1)$$

There are $N_{sym}$[7×1] column vectors in a representative 7 beam embodiment. The column vector for the first symbol, for example, is given by:

$$v_1 = \begin{bmatrix} x_{1,1} \\ \vdots \\ x_{7,1} \end{bmatrix} \quad (2)$$

As each column vector v is read out (starting from the first defined column), a temporary covariance matrix is computed as $$TmpR_{XX} = (\text{Scale Factor}) \cdot \begin{bmatrix} (v_1 v_1')(v_1 v_2')(v_1 v_3') & \cdots & (v_1 v_7') \\ \vdots & \ddots & \vdots \\ (v_7 v_1')(v_7 v_2')(v_7 v_3') & \cdots & (v_7 v_7') \end{bmatrix} \quad (3)$$

where $v_x'$=conjugate($v_x$) and $R_{XX}=R_{XX}+TmpR_{XX}$, initializeR$_{XX}$=zeros (7,7). In an embodiment, since $v_a v_b' = (v_b v_a')'$, only the right upper triangle of TmpR$_{XX}$ needs to be computed and summed because the lower triangle is computed directly from the accumulated results of the upper triangle due to the symmetric conjugate property of R$_{XX}$. In an embodiment, there are a total of 28 accumulators for the upper right triangle from Acc[1] to Acc[28]; each accumulator corresponds to an element of the R upper triangle starting from top to bottom and left to right. This principle is illustrated by Table 1:

TABLE 1

| Upper Triangle ($R_{XX}$) | | ACC[.] | Lower Triangle ($R_{XX}$) | | |
| --- | --- | --- | --- | --- | --- |
| row | col | # | row | col | |
| 0 | 0 | 0 | 0 | 0 | x |
| 0 | 1 | 1 | 1 | 0 | conj(Acc[1]) |
| 0 | 2 | 2 | 2 | 0 | conj(Acc[2]) |
| 0 | 3 | 3 | 3 | 0 | conj(Acc[3]) |
| 0 | 4 | 4 | 4 | 0 | conj(Acc[4]) |
| 0 | 5 | 5 | 5 | 0 | conj(Acc[5]) |
| 0 | 6 | 6 | 6 | 0 | conj(Acc[6]) |
| 1 | 1 | 7 | 1 | 1 | x |
| 1 | 2 | 8 | 2 | 1 | conj(Acc[8]) |
| 1 | 3 | 8 | 3 | 1 | conj(Acc[9]) |
| 1 | 4 | 10 | 4 | 1 | conj(Acc[10]) |
| 1 | 5 | 11 | 5 | 1 | conj(Acc[11]) |
| 1 | 6 | 12 | 6 | 1 | conj(Acc[12]) |
| 2 | 2 | 13 | 2 | 2 | x |
| 2 | 3 | 14 | 3 | 2 | conj(Acc[14]) |
| 2 | 4 | 15 | 4 | 2 | conj(Acc[15]) |
| 2 | 5 | 16 | 5 | 2 | conj(Acc[16]) |
| 2 | 6 | 17 | 6 | 2 | conj(Acc[17]) |
| 3 | 3 | 18 | 3 | 3 | x |
| 3 | 4 | 19 | 4 | 3 | conj(Acc[19]) |
| 3 | 5 | 20 | 5 | 3 | conj(Acc[20]) |
| 3 | 6 | 21 | 6 | 3 | conj(Acc[21]) |
| 4 | 4 | 22 | 4 | 4 | x |
| 4 | 5 | 23 | 5 | 4 | conj(Acc[23]) |
| 4 | 6 | 24 | 6 | 4 | conj(Acc[24]) |
| 5 | 5 | 25 | 5 | 5 | x |
| 5 | 6 | 26 | 6 | 5 | conj(Acc[26]) |
| 6 | 6 | 27 | 6 | 6 | x |

A representation of a complex-conjugate multiplier-accumulator 100 for covariance R$_{XX}$ computation with dynamic loading is shown in FIG. 1. Multiplier-accumulator 100 performs the calculation of Acc=Ar+jAj. Given that $v_x$=a+jb and $v_y$=c+jd→$v_y'$=c−jd then $v_x v_y'$=(a+jb)(c−jd)=(ac+bd)+j(bc−ad). Since (ac+bd)=a(c+d)−d(a−b) and (bc−ad)=c(a+ b)–a(c+c), multiplier-accumulator 100 is designed with adders, represented at 102 and multipliers, represented at 104, to calculate Ar and Aj. A scale factor depends on $N_{sym}$, as does the number of accumulated iterations. Accumulators are cleared at the beginning of each hop.

Figure 2:
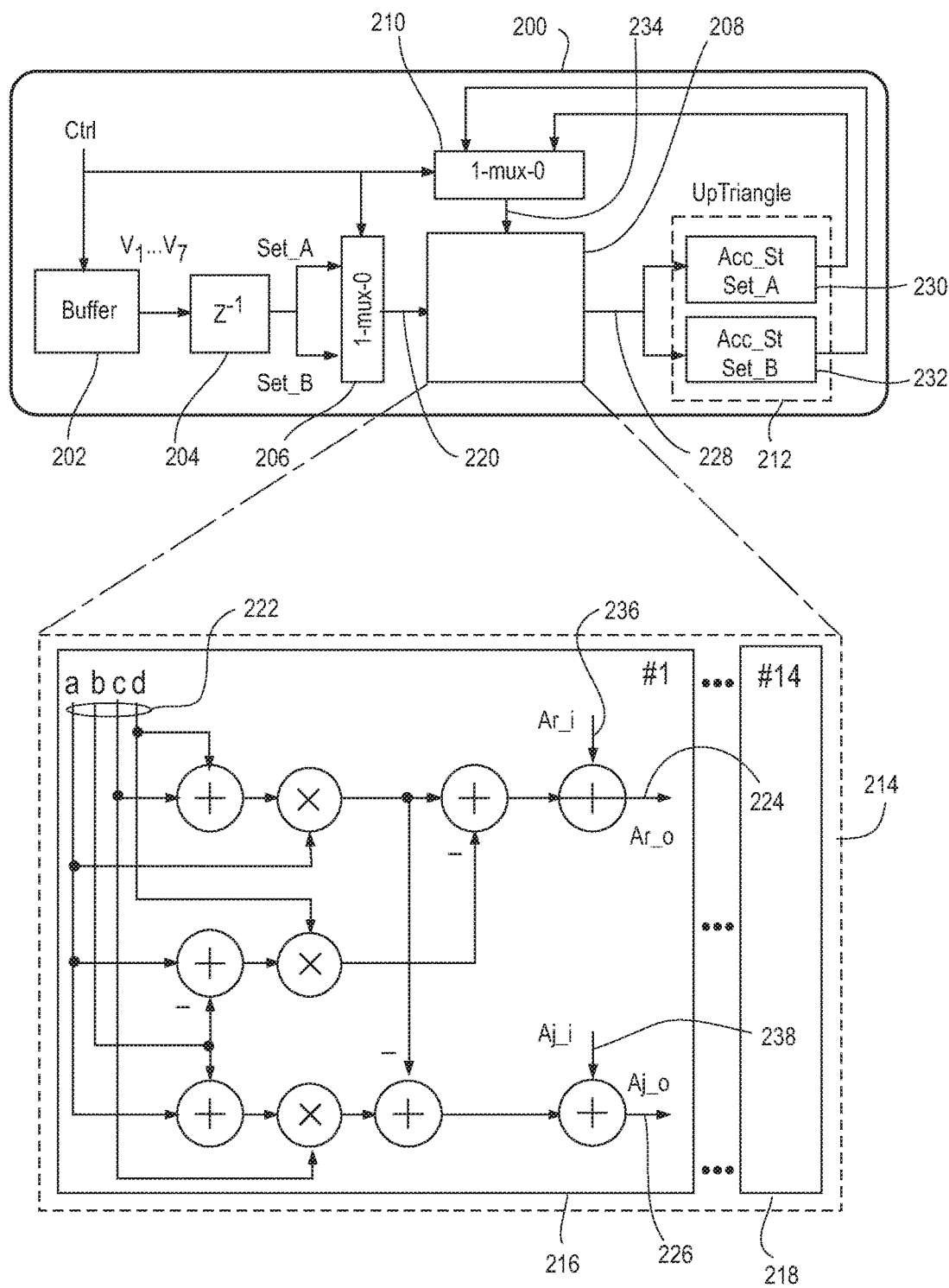
FIG. 2 depicts an apparatus for calculating a covariance matrix.

In an embodiment, a covariance matrix is iteratively calculated as shown in FIG. 2 according to the following steps: (1) read $v_1 \ldots v_7$ column vector from the input data buffer 202; (2) generate $TmpR_{XX}$ in logic element 204 and send to multiplexer 206; (3) perform complex-conjugate multiply in shared multipliers 208, add to previous results from multiplexer 210; (4) store the new 7×7 results into accumulator registers 212 to get ready for next iteration, (5) repeat step 1 to step 5 until $42^{nd}$ iteration.

As explained above with reference to Table 1, a 7×7 covariance matrix may be calculated using only an Upper Right Triangle of 28 elements. In an embodiment, an implementation of the invention is optimized by reducing the number of complex-conjugate multipliers by half and using a time-sharing scheme. The Upper Right Triangle of a covariance matrix as shown in the left three columns of Table 1 may be further divided into SET A and SET B as shown in Table 2. Referring to FIG. 2, the column vector is divided into SET A and SET B and input to multiplexer 206. Multipliers 208 are shown in an expanded view at 214 which depicts multiplier #1 at 216 and multiplier #14 at 218. Multipliers #2-#13 are implied. Output 220 of multiplexer 206 is connected to input 222 of each of multipliers #1-#14 in a time-sharing way so that first the results for Set A as shown in Table 2 are calculated, then the result for Set B is calculated. Outputs 224 and 226 of each multiplier are likewise sent on output 228 to so that the results of Set A are sent to SET A accumulators 230 while the results for SET B are sent to SET B accumulators 232. Previous results are sent from accumulators 230 and 232 through multiplexer 210. Output 234 of multiplexer 210 is coupled to inputs 236 and 238 of each multiplexer #1-#14.

TABLE 2

| SET A | | Acc[.] | SET B | | Acc[.] |
|---|---|---|---|---|---|
| row | col | # | row | col | # |
| 0 | 0 | 0 | 2 | 3 | 14 |
| 0 | 1 | 1 | 2 | 4 | 15 |
| 0 | 2 | 2 | 2 | 5 | 16 |
| 0 | 3 | 3 | 2 | 6 | 17 |
| 0 | 4 | 4 | 3 | 3 | 18 |
| 0 | 5 | 5 | 3 | 4 | 19 |
| 0 | 6 | 6 | 3 | 5 | 20 |
| 1 | 1 | 7 | 3 | 6 | 21 |
| 1 | 2 | 8 | 4 | 4 | 22 |
| 1 | 3 | 9 | 4 | 5 | 23 |
| 1 | 4 | 10 | 4 | 6 | 24 |
| 1 | 5 | 11 | 5 | 5 | 25 |
| 1 | 6 | 12 | 5 | 6 | 26 |
| 2 | 2 | 13 | 6 | 6 | 27 |

Figure 3:
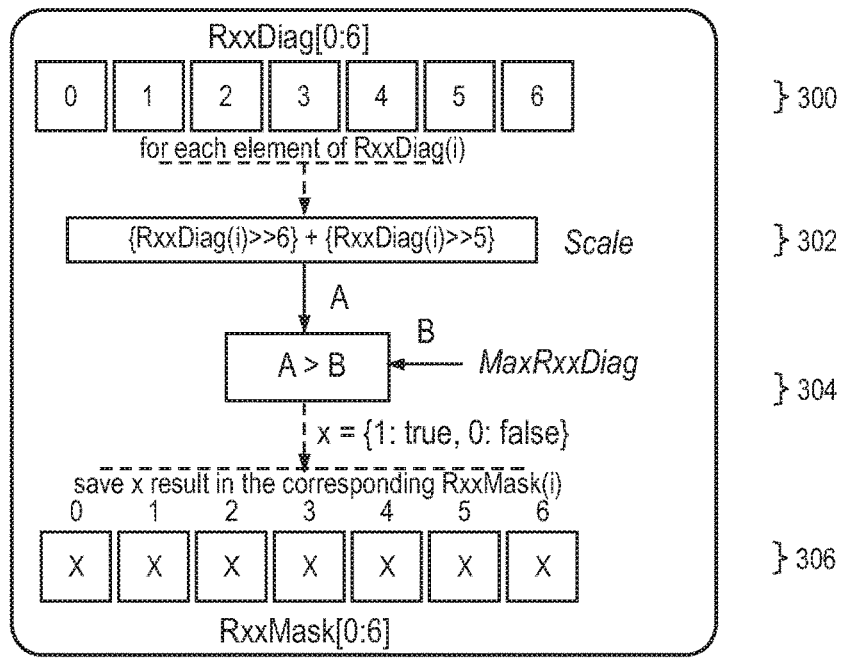
FIG. 3 depicts a method of variable beam selection using the covariance matrix of FIG. 2.
Figure 4:
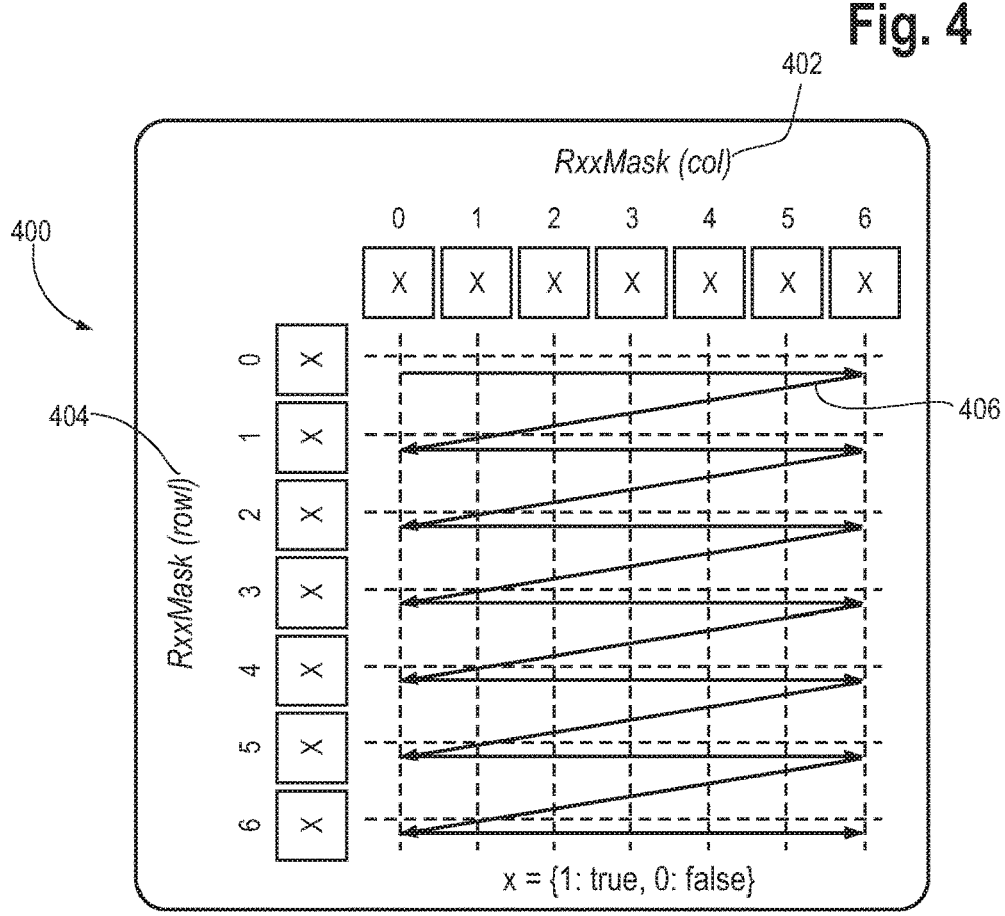
FIG. 4 depicts an updated covariance matrix using the mask of FIG. 3.

In a further embodiment, the beamforming speed and other characteristics may be further optimized using a variable beam selection depicted in FIGS. 3-4. As describe above, after an initial 7×7 covariance matrix R is computed, an Upper Triangle Array of 28 entries is generated. From this array, a variable beam selection may be computed in the following steps, illustrated in FIG. 3:

Save the seven diagonal elements from $R_{XX}$ as $R_{XX}Diag[0:6]$, shown as 300 in FIG. 3.

Select a Variable Beam Selection threshold, VarBeamTh. This value may be a constant or a programmable variable that changes based on the operating signal environment such as whether or not a jamming signal is present. In an embodiment, VarBeamTh=96.

For each element in $R_{XX}Diag[0:6]$, perform the steps of scaling the element with the constant VarBeamTh at 302 of FIG. 3, comparing the scaled result with $MaxR_{XX}Diag$ as shown at 304 and marking a corresponding element in $R_{XX}Mask[0:6]$ index as true or false, shown at 306.

This $R_{XX}Mask[0:6]$ will be used to form indices for the new updated R for QR decomposition (QRD). It will also be used to select the correct alpha elements from alpha vector produced by Alpha Estimate and Alpha Update processors for QRD.

In an embodiment using variable beam selection, a new updated R covariance matrix is generated using the $R_{XX}$-Mask as depicted in FIG. 4.

The RxxMask[0:6] is used for both columns and rows to determine what elements to use for the new updated Rxx in the following steps illustrated in FIG. 4.

(1) Use the RxxMask to form the 2-D array 300. The same RxxMask is used in both the column and rows as RxxMask (col) 402 and RxxMask(row) 404.

(2) Select the elements that have both row & col intersection that are true according to RxxMask(col) 402 and RxxMask(row) 404.

(3) Form a 6-bit index (3-bit row×3-bit col) to be used to extract an element from the Upper Triangle array initially computed.

Note that QR decomposition (QRD) only needs one element at a time for SGR processing, it goes from top to bottom and from left to right (dotted lines 406 of FIG. 4). For QRD to process the updated Rxx, this rule remains true, but some of the elements are not used. Essentially, only a subset of the original 7×7 array is used.

The updated new Rxx can be from 7×7 (if all intersection are true) to 1×1 (only 1 intersection is true). This variation is determined by VarBeamTh.

Figure 5:
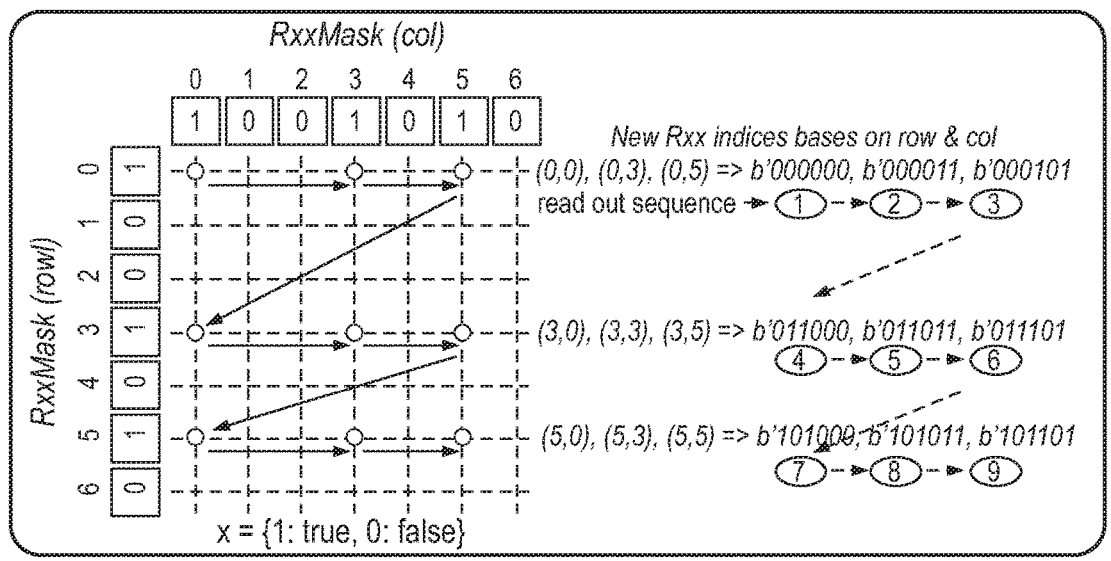
FIG. 5 depicts an example of variable beam selection with a covariance matrix.

An example of this method is illustrated in FIG. 5. In this example, VarBeamTh is selected to extract a 3×3 Rxx from an initial 7×7 Rxx. In this example, it is assumed that RxxMask has Beam 0, 3 and 5 set as being true. The new Rxx 2D-array indices are (0,0), (0,3), (0,5), (3,0), (3,3), (3,5), (5,0), (5,3) and (5,5) as shown in FIG. 5.

Figure 6:
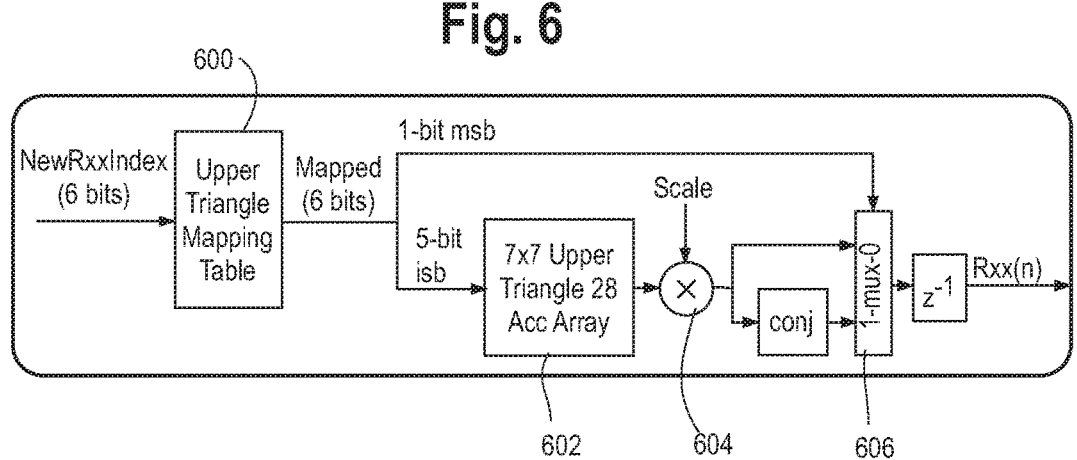
FIG. 6 depicts a further method of processing a covariance matrix.

After all the new Rxx indices are determined based on RxxMask, the next step is to extract the corresponding elements from the initial 7×7 Upper Triangle Accumulated Array (28 entries) as shown in FIG. 6. The new Rxx indices are usually read out according to the QRD scheduler as shown in previous figure. The followings steps are taken to extract the new $R_{XX}$ element for QRD processing:

(1) Take the new R 6-bit index to the Upper Triangle Mapping Table 600 as shown in FIG. 6 and Table 3 (FIG. 8, 800). In this table, the Address In column is the new R 6-bit index while the Address Out is the mapped 6-bit index. Note that a 6-bit input results in 63 (0-63) possible entries, however, since the table shown only has 7×7=49 entries, then input address that are not used can never happen and are ignored. The range of input addresses based on row and column values may go from 0 to 54; however, certain values are not used such as 7, 15, 23, 31, 39 and 47. The values that are used are derived from the concatenation of 3-bit row and 3-bit column. A comparison of Tables 3 and 4 shows the corresponding elements of the initial 7×7 Upper Triangle accumulated array.

(2) Use the lower 5 least significant bits of the mapped 6-bit to index to the 7×7 Upper Triangle Array 602 of FIG. 6 and Table 4 (28 entries) (FIG. 9, 802) to obtain the correct element. Since there are only 28 (0 to 27) entries for the Upper Triangle, and that 5 bits means 32 possible entries, so values 28 to 31 of Table 4 are not used/ignored.

(3) After scaling the output element at 604 of FIG. 6, the most significant bit of the mapped 6-bit is used to select in multiplexer 606 between conjugate and non-conjugate values for QRD for processing as shown in FIG. 6.

Figure 7:
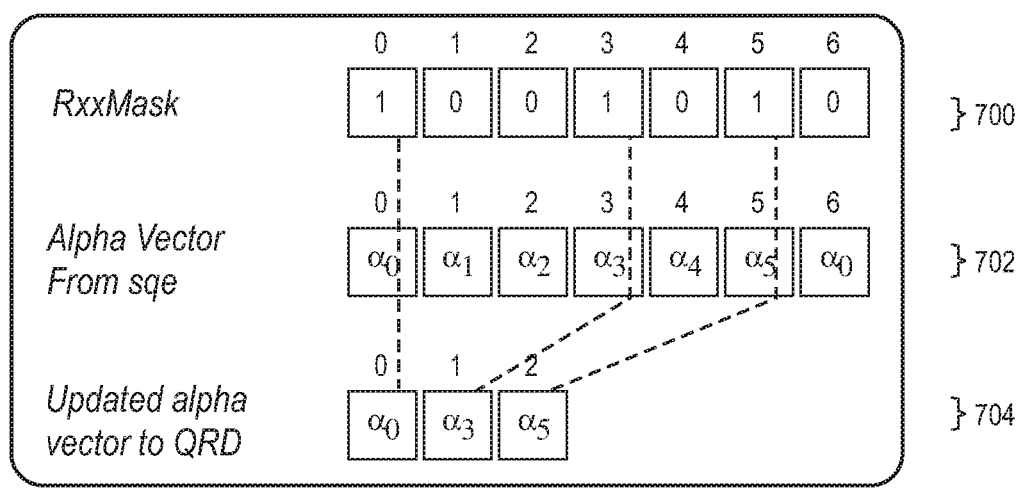
FIG. 7 depicts a process of using a covariance matrix mask to select elements in an alpha vector.

The Variable Beam selection method may also be used to select alpha elements to process with QR Decomposition (QRD). As illustrated in FIG. 7, alpha vector elements are selected based on $R_{XX}$Mask from FIG. 3. For each position or index of the mask bit in $R_{XX}$Mask 700, it is set to be true, then a corresponding alpha element 702 is selected. In other words, the same index is used to extract the alpha element from the input alpha vector 704 sent to QRD. If variable beam selection is not used, in other words, if processing was performed with all 7 beams, the alpha element selection is not needed. A representation based on the example of FIG. 3 is shown in Table 5, which shows how to map the input indices to the Upper Triangle Table 4 to obtain the correct elements to send to QRD based on the 5-bit lsb (least significant bits) of the address output. Note that QRD processes one element at a time. Whenever the 1-bit msb (most significant bit) is true, take the conjugate of the scaled output.

TABLE 5

| Read Order | Address In | Row | Col | Address Out | 1b-msb | 5b-lsb |
|---|---|---|---|---|---|---|
| 1, (0,0) | 0 | 000 | 000 | 0 | 0 | 00000 |
| 2, (0,3) | 3 | 000 | 011 | 3 | 0 | 00011 |
| 3, (0,5) | 5 | 000 | 101 | 5 | 0 | 00101 |
| 4, (3,0) | 24 | 011 | 000 | 35 | 1 | 00011 |
| 5, (3,3) | 27 | 011 | 011 | 18 | 0 | 10010 |
| 6, (3,5) | 29 | 011 | 101 | 20 | 0 | 10100 |
| 7, (5,0) | 40 | 101 | 000 | 37 | 1 | 00101 |
| 8, (5,3) | 43 | 101 | 011 | 52 | 1 | 10100 |
| 9, (5,5) | 45 | 101 | 101 | 25 | 0 | 11001 |

If used and unless otherwise stated, the terms "upper," "lower," "front," "back," "over," "under," and similar such terms are not to be construed as limiting the invention to a particular orientation. Instead, these terms are used only on a relative basis.

The apparatus described above in one example comprises a plurality of components such as one or more of electronic components or hardware components. A number of such components can be combined or divided in the apparatus. The apparatus in one example comprises any (e.g., horizontal, oblique, or vertical) orientation, with the description and figures herein illustrating one example orientation of the apparatus, for explanatory purposes.

The steps or operations described herein are just for example. There may be many variations to these steps or operations without departing from the spirit of the invention. For instance, the steps may be performed in a differing order, or steps may be added, deleted, or modified. Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method of generating a covariance matrix for digital beamforming in a computer processor on input signals from antenna beams stored in a buffer, comprising:

receiving a set of $N_B$ input signals from the buffer where $N_B$=the number of antenna beams;

generating a temporary $N_B \times N_B$ covariance matrix;

dividing the $N_B$ input signals into Set A and Set B;

performing a complex-conjugate multiplication operation on Set A, adding the result to previous Set A accumulator results and storing in Set A accumulators;

performing a complex-conjugate multiplication operation on Set B, adding the result to previous Set B accumulator results and storing in Set B accumulators;

combining the Set A and Set B results to form an $N_B \times N_B$ covariance matrix; and performing digital beamforming of the antenna beams using the $N_B \times N_B$ covariance matrix.

2. The method of claim 1 where each input signal further comprises a plurality of data symbols and the method is repeated for each of the plurality of symbols.

3. The method of claim 2, wherein the Set A and Set B accumulators are cleared after the covariance matrix is generated.

4. The method of claim 2, wherein the number of data symbols is 42.

5. The method of claim 2, wherein the number of data symbols is 84.

6. The method of claim 2, wherein the number of data symbols is 168.

7. The method of claim 1, wherein the number of antenna beams is 7.

8. The method of claim 1, further comprising the steps of:

determining a set of $N_B$ diagonal elements of the $N_B \times N_B$ covariance matrix;

for each element in the set of diagonal elements:

scaling the element with a constant;

comparing the scaled result with a maximum element of the set of diagonal elements; and marking a corresponding element in masking index as true or false; and using the masking index to select elements in the $N_B \times N_B$ covariance matrix.

9. The method of claim 8 wherein the masking index is used on both rows and columns of the $N_B \times N_B$ covariance matrix.

10. The method of claim 8 wherein the constant is a variable beam threshold based on an operating environment of the antenna.

11. A computer processor apparatus configured to perform a method of generating a covariance matrix for digital beamforming the input signals from one or more elements of multi-beam antenna, comprising:

a buffer for storing $N_B$ input signals where $N_B$=the number of antenna beams;

a logic element for generating a temporary $N_B \times N_B$ covariance matrix from the $N_B$ input signals;

a set of $N_B(N_B+1)/4$ complex conjugate multipliers;

a first multiplexer for receiving $N_B(N_B+1)/2$ elements of the temporary covariance matrix further comprising an upper right triangle of the temporary covariance matrix and alternately coupling half of the $N_B(N_B+1)/2$ elements to the set of complex conjugate multipliers;

a set of $N_B(N_B+1)/2$ accumulators divided into first and second sets of $N_B(N_B+1)/4$ accumulators which alternately receive outputs from the set of complex conjugate multipliers; and a second multiplexer alternately coupling the output of the first and second sets of $N_B(N_B+1)/4$ accumulators to an input of the set of $N_B(N_B+1)/4$ complex conjugate multipliers, the logic element performing digital beamforming of the antenna beams using the $N_B \times N_B$ covariance matrix.

12. The apparatus of claim 11 wherein $N_B$ is 7.

13. The apparatus of claim 11, further comprising:
an $N_B$ buffer for storing a set of diagonal elements of the covariance matrix;
a scaling logic element for scaling each element in the set of diagonal elements by a constant value;
a comparator for comparing each scaled element with a maximum element of the set of diagonal elements and generating a true or false output corresponding to the result of the comparison; and
an $N_B$ mask buffer for storing the output of the comparator for each element in the set of diagonal elements.

14. The apparatus of claim 13 further comprising a selection device for using the $N_B$ mask buffer to select elements of the covariance matrix.

15. The apparatus of claim 13 wherein the constant value is a variable beam threshold based on an operating environment of the multi-beam antenna.

* * * * *